UNITED STATES PATENT OFFICE.

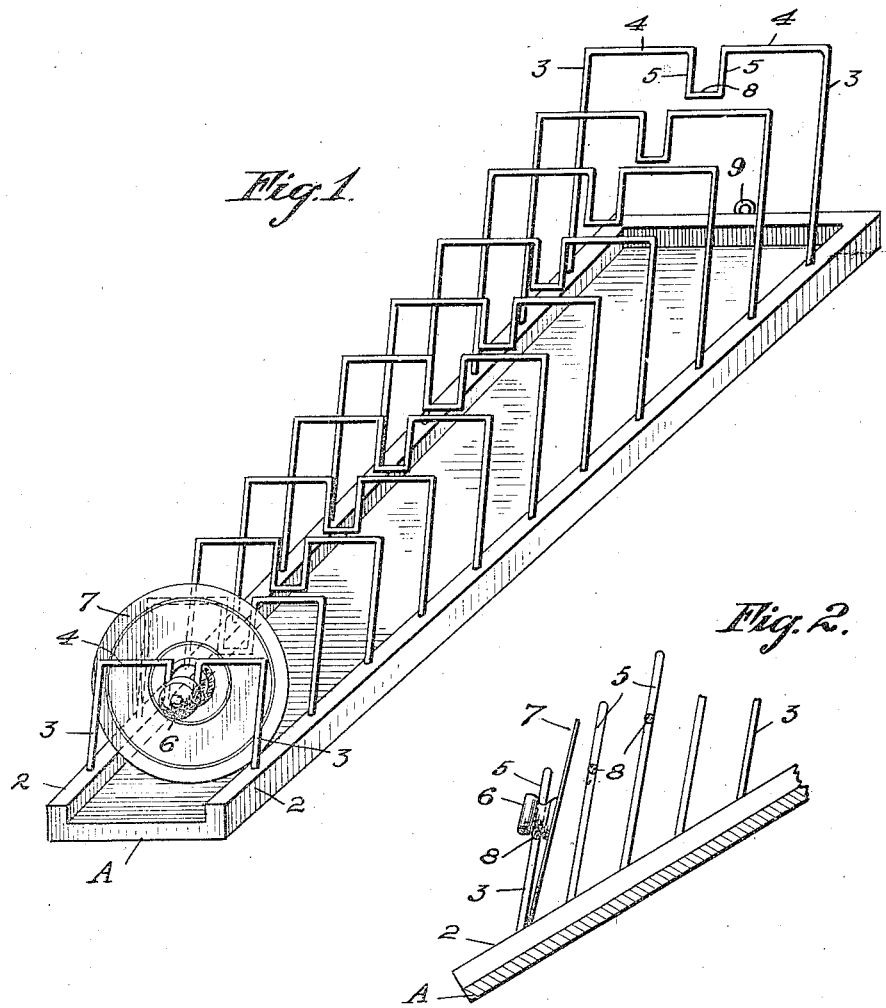

NICKOLAUS SARTER AND OTTO J. BEHM, OF SAN FRANCISCO, CALIFORNIA.

UTENSIL-COVER HOLDER OR RACK.

1,065,000.  Specification of Letters Patent.  Patented June 17, 1913.

Application filed August 15, 1911. Serial No. 644,171.

*To all whom it may concern:*

Be it known that we, NICKOLAUS SARTER and OTTO J. BEHM, both citizens of the United States, residing in the city and county of San Francisco and State of California, have invented new and useful Improvements in Utensil-Cover Holders or Racks, of which the following is a specification.

This invention relates to a rack for holding covers of cooking utensils.

It is the object of this invention to provide a rack which is specially constructed and designed for the purpose of holding the thin sheet metal covers or lids employed on cooking utensils, such as kettles and the like.

A further object is to provide a rack of the above character, which is simple in construction, economical in manufacture, compact and durable.

Other objects will become apparent in the following specification.

The invention consists of the parts and the construction and combination of parts, as hereinafter more fully described and claimed, having reference to the accompanying drawings, in which—

Figure 1 is a perspective view of the invention. Fig. 2 is a detail longitudinal section illustrating the application of the invention. Fig. 3 is a detail in cross section showing a modified form of the cover supporting device.

In the drawings, the base portion of the invention is shown as consisting of a trough-shaped structure having a bottom A of any suitable formation which is designed to be disposed at an angle to the horizontal, as shown in Fig. 1, and is provided with upwardly projecting side flanges 2, preferably formed integral with the bottom A.

The structure composed of the bottom A and side flanges 2 constitutes a trough for carrying off water drained from the covers which are disposed above the trough after washing, as later described.

Mounted on the flanges 2 is a series of cover supporting members, which are here shown in Fig. 1 as formed of wire bent in a peculiar shape to adapt them to the purpose to which they are put. Each cover supporting member consists of a pair of oppositely disposed rearwardly inclined wire standards 3 mounted on the side flanges 2; the upper ends of which standards are bent inwardly at right angles toward each other, as at 4, and are bent downwardly at a point approximately above the longitudinal center of the trough bottom A, as shown at 5. The downwardly extending portions 5 are slightly spaced apart, and form parallel members between which the knob 6 mounted on the cover or lid 7, to be supported in the rack, is placed.

The lower ends of the downwardly extending portions 5 may be joined together, as shown at 8 in Fig. 1, thus forming the cover supporting member in one piece and limiting the outward movement of the side members 3 and 5 when the knob 6 is disposed therebetween, thus adding strength and rigidity to the structure. If desired, spring members 4', such as shown in Fig. 3, may be employed.

In the operation of the invention the cover or lid 7 to be supported in the rack is placed between the supporting members as shown in Fig. 2 with the knob 6 thereon, disposed between the engaging members 5 which hold the cover in a rigid position and at an incline in relation to the base A. The supporting members are preferably of graduated sizes to receive graded sizes of covers or lids, and the base A is tapered divergently from its lower end to its upper end.

From the foregoing it will be seen that I have produced a simple and compact rack for covers of cooking utensils, which can be manufactured and sold at small cost, and which obviates the difficulty and inconvenience commonly met with in stacking the covers or lids, owing to the projecting knobs thereon. The use of this rack admits of lids of various sizes being filed compactly, and is particularly advantageous for use in draining the lids after washing.

The rack is designed to be hung on the wall, and a screw-eye 9 or the like, is attached to the upper end of the base A for that purpose. It is obvious that any other suitable means for supporting the rack in a vertical position may be employed as desired.

Having thus described our invention, what we claim and desire to secure by Letters Patent is—

1. An improved utensil cover holder and rack having in combination a base member, a series of parallel inclined wire standards mounted on the base member, said standards arranged in pairs of graduated height from one end of the base to the other in the direction of their inclination, and each of said standards being provided with centrally located knob engaging means arranged in a stepped-up manner in relation to each other.

2. In a utensil cover holder and rack, the combination of a base member having divergent sides, upwardly extending flanges on the divergent sides of said base member, a series of parallel inclined wire standards mounted on said flanges, said standards arranged in pairs of graduated heights from one end of the base to the other in the direction of their inclination, and means carried by each pair of standards for engaging the knobs on utensil covers, said knobs engaging means arranged in a stepped up manner in relation to each other.

In testimony whereof we have hereunto set our hands in the presence of two subscribing witnesses.

NICKOLAUS SARTER.
OTTO J. BEHM.

Witnesses:
R. S. BERRY,
JOHN H. HERRING.